United States Patent [19]

Boyer et al.

[11] 4,360,503

[45] Nov. 23, 1982

[54] RECOVERY OF TUNGSTEN VALUES FROM ALKALI TUNGSTATE SOLUTIONS BY SOLVENT EXTRACTION

[75] Inventors: Carl W. Boyer, Wyalusing; James N. Christini, Towanda; Martin C. Vogt, Monroeton, all of Pa.

[73] Assignee: GTE Products Corporation, Stamford, Conn.

[21] Appl. No.: 292,380

[22] Filed: Aug. 13, 1981

[51] Int. Cl.$^3$ ............................................. C01G 41/00
[52] U.S. Cl. .................................. 423/54; 75/101 BE
[58] Field of Search ....................... 423/54; 75/101 BE

[56] References Cited

U.S. PATENT DOCUMENTS 3,158,438 11/1964 Kurtak .................................. 423/54
3,293,004 12/1966 Musgrove et al. .................... 423/54
3,598,519 8/1971 Chiola et al. .......................... 423/54
4,175,109 11/1979 Kim ....................................... 423/54

FOREIGN PATENT DOCUMENTS 1240524 7/1971 United Kingdom .................. 423/54

Primary Examiner—Herbert T. Carter
Attorney, Agent, or Firm—Robert E. Walter

[57] ABSTRACT

In a two component extraction system for producing ammonium tungstate from aqueous alkali metal tungstate from aqueous alkali metal tungstate solution, the stripped organic is washed to form a wash solution which is mixed with concentrated ammonia solution to form an aqueous ammonia solution which is mixed with product ammonia tungstate and fed as the stripping solution for contacting the loaded organic extractant.

2 Claims, 2 Drawing Figures

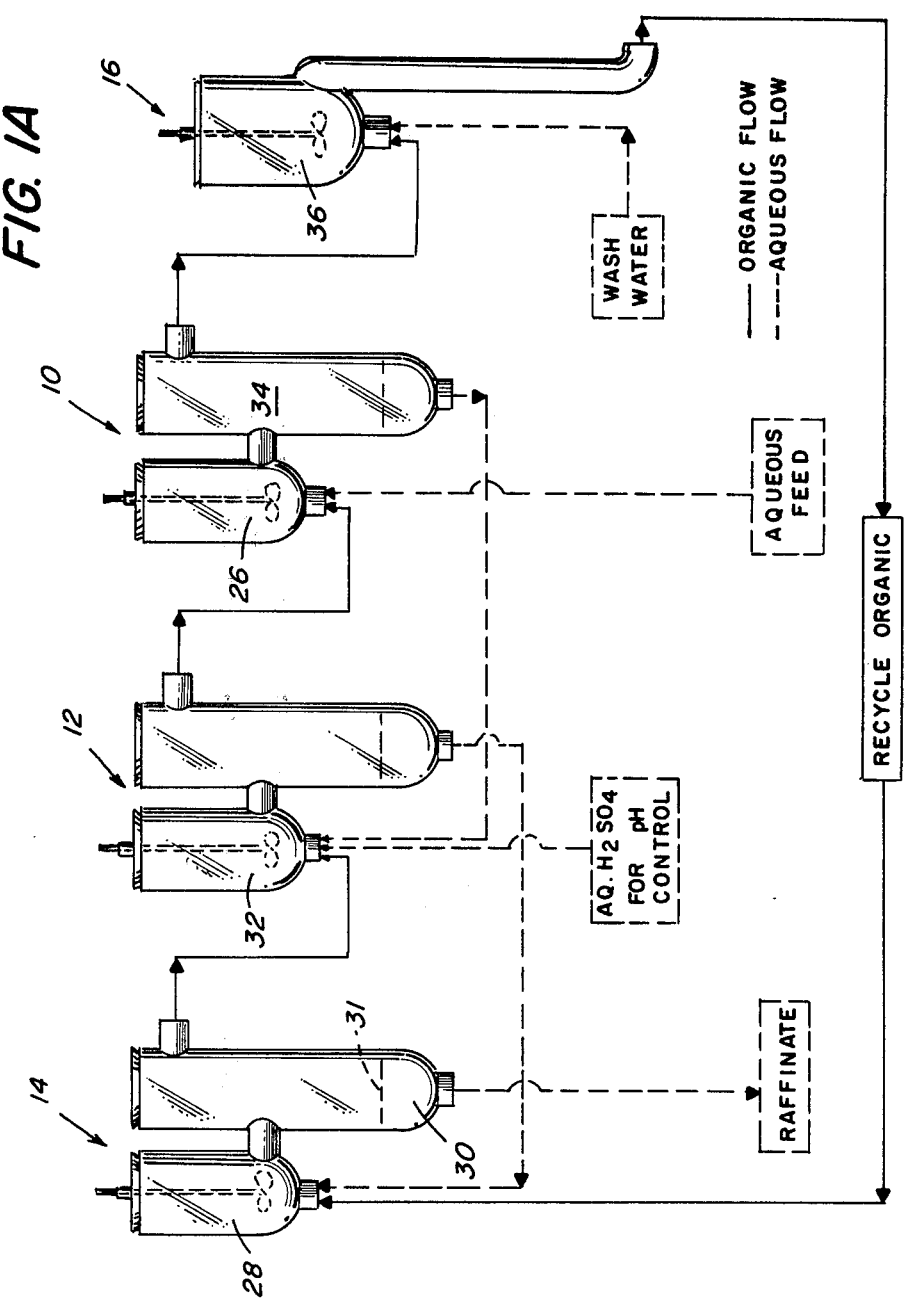

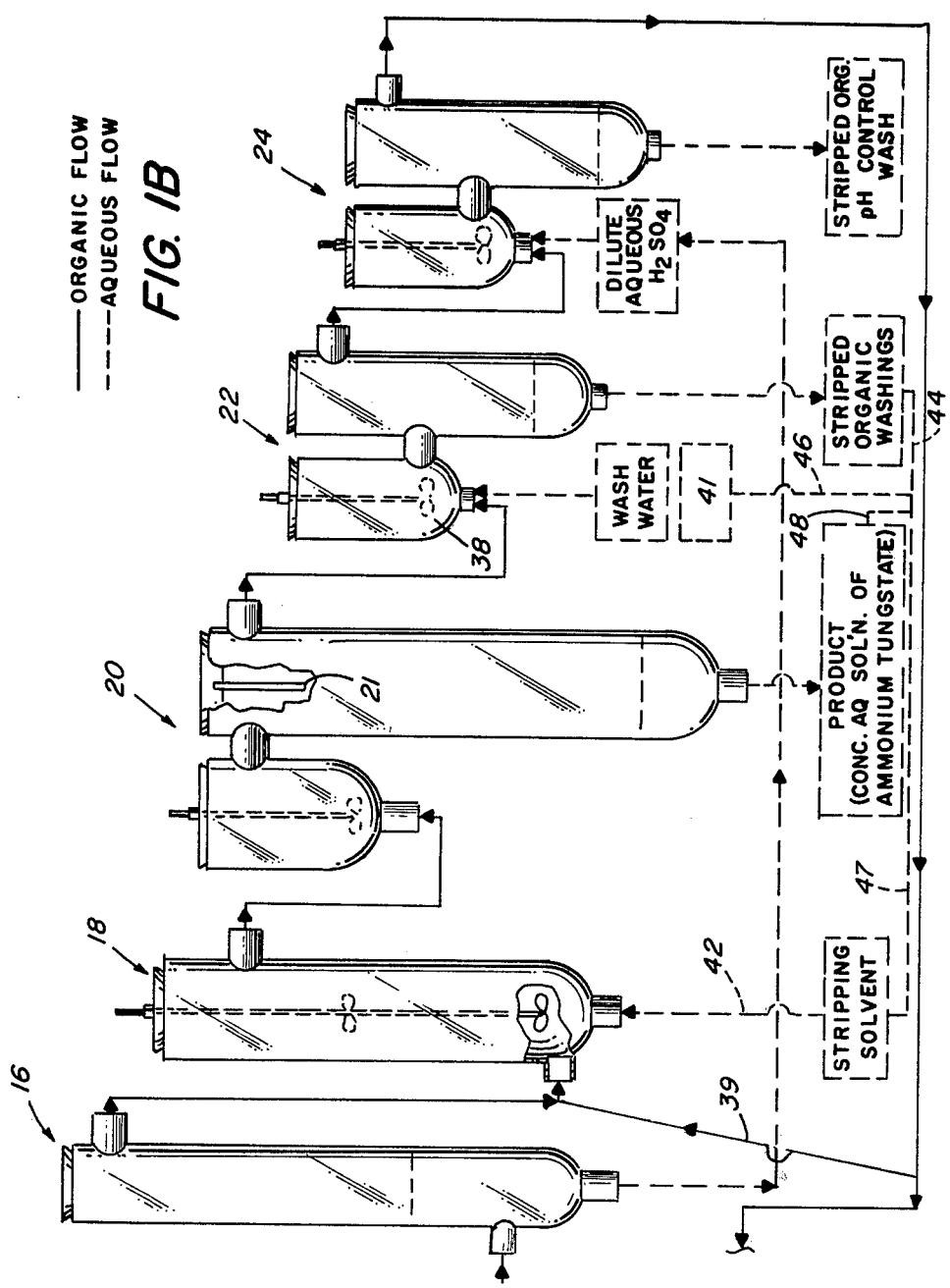

RECOVERY OF TUNGSTEN VALUES FROM ALKALI TUNGSTATE SOLUTIONS BY SOLVENT EXTRACTION

BACKGROUND OF INVENTION

This invention relates to the recovery of tungsten values from aqueous alkali metal tungstate solutions by liquid-liquid solvent-extraction process. More particularly, the invention relates to the extraction of tungsten values by an organic mixture and subsequent recovery of an ammonium tungstate solution by stripping.

Prior art processes relating to recovery of tungsten include U.S. Pat. Nos. 3,158,438 to Kurtak; 3,256,058 to Burwell; and 3,293,004 to Musgrove et al; South African Pat. No. 684,892 and British Pat. No. 1,240,524. U.S. Pat. No. 4,175,109 to Kim relates to a tungsten extraction process.

It is an object of the present invention to provide an improved process for recovery of tungsten values from aqueous alkali metal tungstate solutions.

Other and further objects will become apparent from reading the following description.

SUMMARY

In accordance with the present invention, there is provided a process for producing ammonium tungstate from an aqueous alkali metal tungstate solution comprising the steps of: (a) extracting tungsten values into an organic extractant by contacting said aqueous alkali metal tungstate solution with said organic extractant for a sufficient period of time to form a loaded organic extractant containing tungsten values and a aqueous solution, said organic extractant consisting essentially of from about 6 to about 10 percent by volume of a mixture of tri-alkyl amines having alkyl chains of about 6 to 10 carbon atoms with trisooctyl amine being the major component in said mixture and from 90 to 94 percent by volume of an aromatic solvent consisting essentially of a mixture of alkyl benzenes wherein the alkyl benzenes have molecular weights of 120, 134, 148 and the total number of atoms in the alkyl chains attached to the benzene ring are either 3, 4 or 5; (b) separating said loaded organic extractant from said aqueous solution containing a portion of said impurities; (c) stripping said loaded organic extractant from step (b) by contacting with an aqueous ammonia solution to form an aqueous ammonium tungstate solution and a stripped organic extractant, said contacting being carried out by dispersing said aqueous ammonia solution in said loaded organic extractant wherein said organic extractant forms a continuous phase with said aqueous ammonia solution being dispersed therein as a discontinuous aqueous phase, (d) separating said aqueous ammonium tungstate from said stripped organic extractant; and (e) washing said stripped organic to form a wash solution comprising from about 1 to about 4 percent by weight ammonia and less than about one percent by weight tungstate, adding concentrated ammonia solution to form an aqueous ammonia solution having from about 6 to about 8 weight percent ammonia, and adding ammonium tungstate from step (d) to form a strip solution having an ammonium concentration of from about 6 to about 10 percent and a tungstate concentration of from about one to about 6 percent, and (e) feeding said strip solution to step (c) for stripping, (f) feeding said stripped organic extractant to step (a) for use as said organic extractant.

DRAWINGS

FIGS. 1-A and 1-B illustrate schematically a series of mixer-settler units that can be subdivided into an extraction circuit and a stripping circuit. The extraction circuit comprises three units or stages: a first stage 10, a second state 12, a third stage 14, and a wash or scrub stage 16. The stripping circuit comprises or consists of a stripping column-contactor 18, followed by a mixer-settler 20, a wash stage 22, and organic regeneration stage 24.

DETAILED DESCRIPTION

In the extraction circuit aqueous alkali metal tungstate solution, preferably sodium tungstate solution, is adjusted to a pH of about 1.8 to about 3.0, preferably a pH of about 1.8 to about 2.3. The feed tungstate solution which preferably has a concentration of grams of $WO_3$/liter of from about 100 to about 200 and more preferable of from about 150 to about 180, is fed to mixing compartment 26 of the first extraction stage 10. At the same time barren or unloaded extractant is fed to the mixing compartment 28 of the third extraction stage 14 and flows counter-currently to the aqueous feed flow, i.e., from stage 14 to stage 10, while progressively extracting and loading tungstate at each stage until it reaches a maximum or other desirable loading at stage 10.

The aqueous feed solution while traveling counter-currently to the organic extractant from stages 10, 12, and 14, as is illustrated in FIG. 1-A, becomes progressively depleted of tungsten values. Substantially fully depleted tungstate solution or raffinate is discharged from the settling section 30 of stage 14, and typically has a pH of from about 1.2 to about 2.0, preferably from about 1.4 to about 1.7; a specific gravity of from about 1.07 to about 1.15., preferably from about 1.09 to about 1.13 and contains less than about 0.1 grams of $WO_3$ per liter. The approximate point where separation between the aqueous and organic phase occurs is shown by the broken line 31 of the settling section 30 of stage 14. Similar broken lines indicate the approximate point where phase separation occurs in settling sections of other units or stages in the system.

The loaded organic extractant from the settling section 34 of stage 10 is fed to the mixing section 36 of the wash or scrub stage 16 where it is washed with water, preferably deionized water, to reduce the amount of entrained water insoluble impurities, e.g. sodium sulfate. The settling section of the scrub stage is shown in FIG. 1-B.

In the stripping circuit the scrubbed, loaded organic solution flows to a point near the bottom of the columnar contractor-stripper 18 wherein it is contacted, under controlled agitation, with stripping solution that passes upwardly through the column in co-current flow.

The stripped organic solvent from the mixer-settler unit 20, which is provided with a baffle 21 in the upper part of the settling section where indicated in FIG. 1-B, flows to a wash stage 22 wherein it is scrubbed free of entrained ammonium tungstate. Scrub water, preferably deionized water is fed to the mixing compartment 38 of the wash stage 22.

In the final or organic regeneration stage 24, the stripped and washed organic extractant is regenerated or reconstituted for recycling to the third stage 14 of the extraction circuit by contact with a dilute aqueous solution of sulfuric acid. The regeneration of the organic extractant involves conversion of the amine component thereof to the sulfate or bisulfate form. The extraction of tungsten values by the amine extractant occurs by a mechanism, that involves the exchange of the sulfate or bisulfate ion for the tungstate ion.

The extracting and stripping operations are carried out within a temperature range of from about 30° C. to about 60° C. and preferably from about 40° C. to about 50° C.

The alkali tungstate feed solution may be prepared by any of the previously known procedures including caustic digestion of ore concentrates, fusion of ore concentrates, treatment of leach liquors to remove molybdenum and/or other impurities, and by other known techniques. Wolframite-ore concentrates processed by caustic digestion are preferred sources of tungsten values in order to obtain highly concentrated alkali metal tungstate solutions directly.

In accordance with the present invention, the strip solution comprises from about 6 to about 10 percent by weight ammonia at a pH of from about 10 to about 13. The strip solution which is illustrated as feed stream 42 in FIG. 1B consists essentially of water, ammonia hydroxide, and ammonium tungstate. Preferably, impurities such as other cations and anions are present in an amount less that 1 percent by weight. The above mentioned weight percents are weight percent based on total weight of ammonia in the stripping solution.

The scrubbed, loaded organic extractant is contacted with the stripping solution in contactor 18. Preferably a single stage stripper is utilized in accordance with the process of the present invention to achieve a quantitative stripping of tungsten values. The loaded organic extractant and stripping solution travel in co-current flow through the contactor. The dispersing of aqueous ammonia solution in the loaded organic extractant is carried out to provide an organic continuous phase. The ratio of organic extractant to the aqueous stripping solution based on volume is preferably from about 7.0 to one to about 3.5 to one and more preferably from about 5.0 to one to about 4.2 to one. The contactor is operated with an excess organic phase over aqueous phase. To maintain this ratio, a proportion of the already stripped organic may be conveniently recycled through the contactor as stream 39.

The contactor 18 is preferably operated so as to maintain the organic phase as a continuous phase with the aqueous phase dispersed therein. The aqueous phase is dispersed to such an extent that settling results in the separation of the phases. The dispersion should not result in the formation of an emulsion. As illustrated in the drawing, the loaded organic extractant and the stripping solution is contacted in co-current flow.

A preferred method for determining whether the organic phase is continuous is by measuring the conductivity of the fluid in the contactor 18. If the fluid is non-conductive as determined by test, the organic phase is continuous. If the fluid is conductive as determined by test, the aqueous phase is continuous. The conductivity may be conveniently tested by immersing a pair of electrodes connected to a voltage source into the contactor 18. If during operation, voltage registers on a voltage meter, the operator knows that the aqueous phase has become continuous. In this case, the aqueous phase should be removed from the contactor and contactor filled with organic phase. The operation may be resumed by operating under the preferred conditions hereinbefore discussed.

The positioning of the lower agitator blades in the columnar-contactor 18, which should be a closed vessel is important. As illustrated in FIG. 1-B, the lower blades should be placed just above the horizontal plane across the column at a point corresponding to the top of the slide inlet for the loaded organic extractant. The location of the upper blades with respect to the distance from the top and bottom of the vessel is not critical other than that they should be so located that the upwardly flowing, agitated mixture of stripping agent and loaded organic extractant is substantially uniform; otherwise, an emulsion or a phase separation may occur. Both the upper and lower blades are attached to a shaft. The r.p.m. is adjusted so that the admixed stripping agent and loaded organic extractant flow upwardly as a mass with the aqueous dispersed in the organic phase.

Extraction units other than mixer settlers may be employed without affecting the operation of the contactor-stripper 18. Examples of such other types of extraction units are centrifugal devices, multi-stage columns of various types including unpacked columns, packed columns, pulse-type columns and others.

With starting concentrations in the aqueous feed and in the loaded organic as hereinbefore described, the desired product which exits from mixer settler 20 is an aqueous solution of ammonium tungstate comprising from about 100 to about 300 grams of $WO_3$ per liter. The concentration of ammonia is from about 6 to about 9 percent by weight. Substantially all of the tungsten values are recovered as ammonium tungstate after passing through units 18 and 20.

The mixer settler 20 is provided for additional agitation and settling for separation of the organic and aqueous phases. Mixed stripped organic extractant may be fed directly to a settling unit with proper sizing of the column stripping unit.

The organic extractant employed is a two component extractant consisting essentially of an active amine extractant and an organic solvent. The extractant is described in detail in U.S. Pat. No. 4,175,109 to Kim, issued Nov. 20, 1979, which is incorporated by reference into the present application.

In accordance with the present invention, the strip solution or stream 42 as hereinbefore discrised is constituted or made up from the stripped organic washings or stream 44 exiting from the wash stage 22, concentrated ammonium hydroxide or stream 46 from the ammonia steam stripper 41, and a portion of the ammonium tungstate product or stream 48. The stripped organic washings or wash stream 44 comprises from about 1 to about 4 percent by weight ammonia and less than about one percent of weight tungstate. Preferably the ammonia concentration is from about 1 to about 2 percent. The more effective the wash the less ammonia and tungstate contained in the wash stream. Typically, the wash solution contains greater than about 0.3% by weight tungstate. By recycling the wash solution, tungstate remains in the system and affords environmental protection.

The steam stripper 41 is a conventional unit wherein aqueous ammonia containing solutions are stripped with steam and the ammonia-water vapor is condensed and collected as concentrated ammonium hydroxide solution having an ammonia concentration greater than 20 percent and up to about 30 percent. Sufficient ammonium hydroxide from stripper 41 is added to the wash stream 44 to form an aqueous ammonia solution illustrated at stream 47 having from about 6 to about 8 percent by weight ammonia. Typically additions of concentrated ammonium hydroxide, about 28 percent ammonia solution, are about 1 part by weight per 3 to 5 parts by weight wash stream.

To the aqueous ammonia solution or stream 47, product ammonia tungstate from stream 48 is added to form a strip solution having a concentration of ammonia of from about 6 to about 10 percent and a tungstate concentration of about one to about 6 percent. It is theorized that the ammonia tungstate acts as a buffer so as to stabilize the stripping solution. It has been found that the phase separation and stripping in general is improved by the ammonia tungstate addition. Preferably sufficient product ammonia tungstate is added to increase the tungstate concentration to about 3 to about 5 percent by weight.

The resulting strip solution is fed to the stripper as feed stream 42. With the stripping solution of the present invention it is preferable to operate with an excess organic phase over aqueous phase. Hence, a portion of the stripped organic is recycled as stream 39 as hereinbefore described.

EXAMPLE I

The stripping circuit as described in the drawings is carried out on a small scale. For each of the units 20, 22, and 24, the mixing section holds about 50 milliliters and the settling section holds about 150 milliliters of liquid. The stripping solution was 9.5 percent by weight ammonia at a pH of 11.7 prepared by diluting a concentrated ammonium hydroxide, 30.6 percent by weight ammonia, obtained by steam stripping dilute ammonia solutions. The loaded organic consisted of 8 percent by volume Adogen 381, 92 percent by volume SC solvent 150 which was contacted with 1.5 N sulfuric acid to make the amine salt prior to loading by contacting with sodium tungstate solution. The small scale stripping circuit was operated with 20 hours by feeding the aqueous solution at the rate of 42 milliliters per minute. The organic to aqueous ratio is at 4.2 to 1 in the contacting. The stripped organic solution is recycled at the ratio of 6.5 milliliters per minute. The stripped organic washings containing about 2 percent by weight ammonia and about 0.5 percent by weight tungstate are mixed with an ammonia hydroxide solution containing about 27 percent by ammonia by weight to form a solution containing about 15.4 percent by volume stripped organic washings. Product ammonium tungstate containing about 178 grams of tungsten per liter is mixed with the above mixture to form a resulting strip solution containing about 8% by weight ammonia. The small scale stripping circuit was operated at a pH of about 9.5±0.1. The product ammonium tungstate had a concentration of about 178 grams of $WO_3$ per liter after about 5 hours. The pH was 10.4 and specific gravity was about 1.136.

While there has been shown and described what are considered preferred embodiments of the present invention, it will be obvious to those skilled in the art that various changes and modifications may be made therein without departing from the scope of the invention as described in the appended claims.

We claim:

1. A process for producing ammonium tungstate from an aqueous alkali metal tungstate solution containing impurities comprising the steps of: (a) extracting said tungsten values into an organic extractant by contacting said aqueous alkali metal tungstate solution with said organic extractant for a sufficient period of time to form a loaded organic extractant containing tungsten values and an aqueous solution containing a portion of said impurities, said organic extractant consisting essentially of from about 6 to about 10 percent by volume of a mixture of tri-alkyl amines having alkyl chains of about 6 to 10 carbon atoms with tri-isoctyl ammine being the major component in said mixture and from 90 to 94 percent by volume of an aromatic solvent consisting essentially of a mixture of alkyl benzenes wherein the alkyl benzenes constituting the mixture of alkyl benzenes have molecular weights of 120, 134, 148 and a total number of atoms in the alkyl chains attached to the benzene ring are either 3, 4, or 5; (b) separating said loaded organic extractant from said aqueous solution containing a portion of said impurities; (c) stripping said loaded organic from step (b) by contacting with an aqueous ammonia solution to form an aqueous ammonium tungstate solution and a stripped organic extractant, said contacting being carried out by dispersing said aqueous ammonia solution in said loaded organic extractant wherein said organic extractant forms a continuous phase with said aqueous ammonia solution being dispersed therein as a discontinuous aqueous phase and the volume ratio of said aqueous ammonia to said organic extractant is from about 7 to 1 to about 3.5 to 1, (d) separating said ammonium tungstate from said stripped organic extractant; and (e) washing said stripped organic to form a wash solution comprising from about 1 to about 4 percent by weight ammonia and less than about one percent by weight tungstate, adding concentrated ammonia solution to form an aqueous ammonia solution having from about 6 to about 8 weight percent ammonia, and adding ammonium tungstate from step (d) to form a strip solution having an ammonium concentration of from about 6 to about 10 percent and a tungstate concentration of from 1 to about 6 percent, (e) feeding said strip solution to step (c) for stripping, and (f) feeding one portion of said stripped organic extractant to step (a) for use as said organic extractant and another portion to step (c) for maintaining said ratio of aqueous organic to organic extractant.

2. A process for producing ammonium tungstate from an aqueous alkali metal tungstate solution according to claim 1 wherein said volume ratio is from about 5.0 to one to about 4.2 to one.

* * * * *

UNITED STATES PATENT AND TRADEMARK OFFICE
CERTIFICATE OF CORRECTION

PATENT NO. : 4,360,503

DATED : Nov. 23, 1982

INVENTOR(S) : Boyer et al

It is certified that error appears in the above—identified patent and that said Letters Patent is hereby corrected as shown below:

Claim 1, column 6, line 35, replace "7 to 1" with --1 to 7--;

Claim 1, column 6, line 35, replace "3.5 to 1" with --1 to 3.5--;

Claim 2, column 6, lines 54 and 55, replace "5.0 to one" with --one to 5.0--;

Claim 2, column 6, line 55, replace "4.2 to one" with --one to 4.2--.

Signed and Sealed this

Fifteenth Day of November, 1988

*Attest:*

DONALD J. QUIGG

*Attesting Officer*  *Commissioner of Patents and Trademarks*